United States Patent Office 3,043,864
Patented July 10, 1962

3,043,864
PROCESS FOR THE PRODUCTION OF CYCLOHEXYLSULFAMATES
Noriyuki Okuda and Kikuji Suzuki, Tokyo, Japan, assignors to Daiichi Seiyaku Co., Ltd., Tokyo, Japan, a corporation of Japan
No Drawing. Filed Feb. 9, 1959, Ser. No. 791,789
Claims priority, application Japan Feb. 21, 1958
5 Claims. (Cl. 260—500)

This invention relates to a new process for producing cyclohexylsulfamates, which are widely used as a sweetening agent, and more particularly to a process for the production of cyclohexylsulfamates through the intermediary of cyclohexylammonium cyclohexylsulfamate obtained by reacting cyclohexylamine with ammonium nitrilosulfate.

An object of this invention is to obtain the desired cyclohexylsulfamate economically and commercially.

A further object of this invention is directed to the producing of a good yield of cyclohexylsulfamate using economical and readily available compounds as raw materials.

Other objects, features and advantages of this invention will be apparent from the following detailed description.

Several processes for producing cyclohexylsulfamates, such as from cyclohexylamine and chlorosulfonic acid have been known as described in United States Patents Nos. 2,275,125 and 2,383,617. Processes for producing cyclohexylsulfamates from cyclohexylamine and sulfamic acid or its metal salt or ammonium salt are shown by British Patent No. 662,800; U.S. Patent No. 2,804,472 and U.S. Patent No. 2,804,477 and a process for producing the compound from cyclohexyl hydroxylamine and sulfur dioxide is taught by German Patent No. 950,369. Triammonium nitrilosulfate, used as raw material in this invention, is quite different from compounds used in the processes described above and is a substance not yet widely used in industry. Triammonium nitrilosulfate produced from ammonium nitrite and ammonium acid sulfite in aqueous solutions is stable in alkali, and easily handled.

In the production of cyclohexylsulfamate by the process according to this invention, when cyclohexylamine in excess of the theoretical amount needed to react with triammonium nitrilosulfate is added to the triammonium nitrilosulfate and the mixture is reacted, the reaction may be carried out smoothly and the yield is better. It is advisable to use cyclohexylamine in an amount of about 1.5–2.0 times of the theoretical amount needed. The reaction in this invention can be carried out in two steps.

In the reaction of the first step, 3 moles of ammonia is evolved from one mole of triammonium nitrilosulfate, and tricyclohexylammonium nitrosulfate is then produced as shown in the following equation:

$$N(SO_3NH_4)_3 + 3C_6H_{11}NH_2 \rightarrow N(C_6H_{11}NH_3SO_3)_3 + 3NH_3$$

In the second step, if the reaction temperature is further raised, cyclohexylamine which has not yet reacted, reacts further, and cyclohexylammonium cyclohexylsulfamate is obtained in accordance with the following equation:

$$N(C_6H_{11}NH_3SO_3)_3 + 3C_6H_{11}NH_2 \rightarrow 3C_6H_{11}NHSO_3NH_3C_6H_{11} + NH_3$$

As both the reactions set forth above can be carried out continuously without the need of removing intermediate products, these reactions are commercially favorable. These reactions can be effected under an atmospheric pressure, but it takes many hours, for example, more than 8 hours and the yield is inferior to that produced at a higher pressure. However, if the reaction takes place at a slightly higher pressure than atmospheric, for example, at 1.5 kg./cm.² to 3.0 kg./cm.², the reaction may be completed within a few hours, for example, 3 hours and the desired product can be obtained with a better yield, for example, with a yield of 94%. It is desirable that the reaction vessel, for example, an autoclave, is charged with the aforesaid raw materials and means are provided to maintain the pressure in the vessel at about 1.5 kg./cm.² while withdrawing ammonia gas evolved by heating from the vessel. Furthermore, it is more advantageous to effect the reaction under the stream of nitrogen gas, but such procedure is not mandatory. It is desirable to effect the reaction of the second step at 160–170° C. The cyclohexylammonium cyclohexylsulfamate thus obtained can be converted to sodium or calcium cyclohexylsulfamate by a conventional method. Namely, after cyclohexylamine in the autoclave, which has not yet reacted, has been distilled off, sodium hydroxide solution is added to the residue and thus cyclohexylamine is liberated from the cyclohexylammonium cyclohexylsulfamate and distilled off as its cyclohexylamine hydrate. Thereafter, the remaining liquid is concentrated and sodium cyclohexylsulfamate is obtained. If this product is purified by conventional methods the desired cyclohexylsulfamate can be obtained. If a calcium hydroxide slurry is used instead of the said sodium hydroxide solution, calcium cyclohexylsulfamate may be obtained in the same manner as that described above.

The following example illustrates a way in which the process of this invention may be carried out in practice.

Example 0.519 kg. of triammonium nitrilosulfate (purity 95%; 1.6 moles) and 1.66 kg. of cyclohexylamine (16.8 moles) were charged in a 5 liter autoclave. The mixture was heated while agitated, and when the temperature in the autoclave reached 80° C. the evolution of ammonia gas began. The evolution of ammonia gas became very strong at 120° C. and thus tricyclohexylammonium nitrilosulfate was produced at the time. Then the temperature was raised to 170° C. and the reaction was carried out for 3 hours, during which time the valve controlling the autoclave pressure was adjusted to maintain the pressure in the autoclave at 1.5 kg./cm.². It is more advantageous to effect the reaction while passing nitrogen gas but it is not mandatory. After the reaction has been completed, cyclohexylamine which has not yet taken part in the reaction, was recovered by distillation under reduced pressure. 0.518 kg. of anhydrous cyclohexylamine was recovered. After distilling off this cyclohexylamine, the residue was mixed with 3.1 kg. of 19% sodium hydroxide solution and then cyclohexylamine was recovered as cyclohexylamine hydrate. Thereafter, the residue in the autoclave was mixed with 2,500 cc. of water to dissolve the residue and the solution thus obtained was decolorized by activated carbon and then concentrated under reduced pressure and cooled. Crude crystals of sodium cyclohexylsulfamate were collected by filtration and dissolved again in 5,500 cc. of distilled water. The pH of the solution was adjusted to 5.6 with acetic acid and the solution was decolorized by activated carbon and then concentrated under reduced pressure. The concentrated solution was cooled and the crystals separated were collected by filtration and dried.

The yield of sodium cyclohexylsulfamate was 925 grams which corresponds to 94% of the theoretical amount.

What we claim is:
1. A process for producing cyclohexylsulfamates, which comprises forming a liquid reaction mixture of cyclohexylamine and triammonium nitrilosulfate in excess of a 6 to 1 mol ratio to each other, respectively, heating the mixture at 70° to 130° C. to produce tricyclohexylammonium nitrilosulfate with the evolution of am- monia, heating the mixture at 160° to 170° C. to react the tricyclohexylammonium nitrilosulfate with unreacted cyclohexylamine to produce cyclohexylammonium cyclohexylsulfamate, and decomposing the cyclohexylammonium cyclohexylsulfamate with a strong base to produce a cyclohexylsulfamate.

2. A process as claimed in claim 1, in which the cyclohexylamine is used in a molar amount 9 to 12 times the molar amount of the triammonium nitrilosulfate.

3. A process as claimed in claim 1, in which the reaction at 160° to 170° C. is conducted at a pressure of 1.5 to 3.0 kg./cm.$^2$.

4. A process as claimed in claim 1, in which the strong base is a member selected from the class consisting of sodium hydroxide solution and calcium hydroxide emulsion.

5. A process as claimed in claim 1, in which excess cyclohexylamine is recovered by distillation prior to the step of decomposing the cyclohexylammonium cyclohexylsulfamate.

References Cited in the file of this patent

FOREIGN PATENTS 662,800     Great Britain _____ Dec. 12, 1951

OTHER REFERENCES

Audrieth et al.: "Chemical Reviews," vol. 26, pages 87–88 (1940). (Copy in Library.)